(12) United States Patent
Zhang et al.

(10) Patent No.: US 12,468,097 B2
(45) Date of Patent: Nov. 11, 2025

(54) OPTOELECTRONIC DEVICE HAVING ATTENUATING LENS BLOCK AND SOURCE MONITORING

(71) Applicant: II-VI Delaware, Inc., Wilmington, DE (US)

(72) Inventors: Mengfei Zhang, Shanghai (CN); Yichun Xie, Shanghai (CN); Ranran Zhang, Shanghai (CN); Cuiyan Shao, Shanghai (CN); Yang Li, Shanghai (CN); Wen Wu, Shanghai (CN); Hui Yang, Shanghai (CN)

(73) Assignee: II-VI DELAWARE, INC., Wilmington, DE (US)

( * ) Notice: Subject to any disclaimer, the term of this patent is extended or adjusted under 35 U.S.C. 154(b) by 343 days.

(21) Appl. No.: 18/061,356

(22) Filed: Dec. 2, 2022

(65) Prior Publication Data

US 2023/0393353 A1   Dec. 7, 2023

(30) Foreign Application Priority Data

Jun. 2, 2022   (CN) .......................... 202210621413.6

(51) Int. Cl.
  *G02B 6/42* (2006.01)
(52) U.S. Cl.
  CPC ......... *G02B 6/4214* (2013.01); *G02B 6/4206* (2013.01); *G02B 6/4246* (2013.01); *G02B 6/4261* (2013.01); *G02B 6/428* (2013.01); *G02B 6/4292* (2013.01); *G02B 6/4278* (2013.01); *G02B 6/4286* (2013.01)

(58) Field of Classification Search
  CPC .................................................. G02B 6/4214
  See application file for complete search history.

(56) References Cited

U.S. PATENT DOCUMENTS

| 10,466,427 | B2 | 11/2019 | Wang et al. |
| 10,582,611 | B2 | 3/2020 | Hsieh et al. |
| 2014/0086579 | A1* | 3/2014 | Shao ........................ G02B 6/34 385/33 |
| 2014/0314422 | A1* | 10/2014 | Shao ...................... H04B 10/40 398/138 |
| 2017/0192214 | A1* | 7/2017 | Chen .................... G02B 6/4208 |
| 2018/0017743 | A1* | 1/2018 | Morioka .............. G02B 6/3897 |

\* cited by examiner

*Primary Examiner* — Michelle R Connelly
(74) *Attorney, Agent, or Firm* — Blank Rome LLP (57) ABSTRACT

An optoelectronic device is used with an optical fiber for data transmission and has a transmitter mounted on a printed circuit board (PCB) to emit light. A collimation lens on a lens block receives the light incident thereto. A microstructure on a reflective surface of the lens block has sections that reflect the light into attenuated portions. A focusing lens on the lens block focuses a first attenuated portion from first sections of the reflective surface to the optical fiber. Meanwhile, second sections of the reflective surface reflect a second attenuated portion to another reflective surface on the lens block. The second attenuated portion passes out of a refractive surface on the lens block to an receiver, which is mounted on the PCB adjacent the transmitter. The second attenuated portion of the light can be used to monitor the optical output of the transmitter.

13 Claims, 7 Drawing Sheets

OPTOELECTRONIC DEVICE HAVING ATTENUATING LENS BLOCK AND SOURCE MONITORING

CROSS-REFERENCE TO RELATED APPLICATIONS

The present application claims priority to Chinese Patent Application No. 202210621413.6 filed Jun. 2, 2022. The aforementioned application is hereby incorporated by reference in its entirety.

BACKGROUND OF THE DISCLOSURE

Optoelectronic modules are used for optoelectronic communication. Some optoelectronic modules are pluggable so the modules can be inserted into and removed from a cage of a host device, such as a host computer, a switching hub, a network router, or a switch box. The optoelectronic modules typically communicate with the host device by transmitting and/or receiving electrical data signals to and/or from the host device. The optoelectronic modules then communicate data as optical signals along optical cables.

To do the data transmission, the optoelectronic module converts optical signals to electrical signals and converts electrical signals to optical signals. Typically, the optical signals are transmitted through optical fibers connected to the module, and the conversion occurs at a circuit board in the optoelectronic module. In general, the optoelectronic module can be a board-mounted optical assembly (BOA) or an optical engine, or the optoelectronic module can be a pluggable optoelectronic module, such as an XFP, a QSFP, an SFP+, or another pluggable module. At the optoelectronic module, the optical signals are transduced to electrical signals using optical receivers. The electrical signals are then communicated along etched copper traces integrated into the circuit board to the host device. Likewise, electrical signals from the host device are communicated along etched copper traces and are transduced to optical signals by optical transmitters in the optoelectronic module. The optical signals are then further communicated along the same or a different optical cable that interfaces with the optoelectronic module.

In some optoelectronic modules, a lens assembly is used in an optical interface between optical fibers and active optical devices in the modules. The optical interface generally supports one or more optical fibers that communicate the optical data to and from the optoelectronic module.

One of the shortcomings of optoelectronic modules is that they include many optically and electrically conductive components as well as many components that require significant manufacturing and assembly processes. In some optoelectronic modules, for example, a carbon-doped lens, an attenuation plate, or an antireflection (AR) coating is used to provide optical attenuation of the optical signals. Implementing these techniques can be costly and can require secondary assembly steps to be performed, which can introduce contaminants during the assembly process.

The subject matter of the present disclosure is directed to overcoming, or at least reducing the effects of, one or more of the problems set forth above.

SUMMARY OF THE DISCLOSURE

According to the present disclosure, an optoelectronic device is used with at least one optical fiber. The optoelectronic module comprises at least one transmitter, a lens block, an input, and a first output. The at least one transmitter is disposed in the device and is configured to emit light. The lens block is disposed in the device adjacent the at least one transmitter, and the input on the lens block is configured to receive the light emitted from the at least one transmitter incident thereto. A first section of a first reflective surface on the lens block is configured to reflect a first attenuated portion of the light, and the first output on the lens block is configured to output the first portion of the light to the at least one optical fiber.

In a further configuration, a second section of the first reflective surface is configured to reflect a second attenuated portion of the light, and a second output on the lens block is configured to output the second attenuated portion of the light. The device includes at least one receiver disposed in the device adjacent the lens block. The at least one receiver is configured to receive the second attenuated portion of the light propagated from the second output.

For this configuration, the second output of the lens block can include a second reflective surface, which opposes the first reflective surface and is configured to reflect the second attenuated portion of the light. A refractive surface on the lens block can then be configured to refract the second attenuated portion of the light, reflected from the second reflective surface, outside the lens block to the at least one receiver.

In this configuration, the first reflective surface is disposed at an angled plane relative to the input and the first output. The first section of the first reflective surface includes first divisions of the first reflective surface disposed on the angled plane, and the second section of the first reflective surface includes second divisions of the first reflective surface disposed at an angle from the angled plane.

According to the present disclosure, an active optical cable can have an optoelectronic device as disclosed above.

According to the present disclosure, a lens block is used for routing light from a transmitter to an optical fiber. The lens block comprises an input, a first reflective surface, and a first output. The input on the lens block is configured to receive the light emitted from the transmitter incident thereto. A first section of the first reflective surface on the lens block is configured to reflect a first attenuated portion of the light from the input. The first output on the lens block is configured to output the first attenuated portion of the light from the first reflective surface to the optical fiber.

In a further configuration, the lens block further comprises a second section of the first reflective surface being configured to reflect a second attenuated portion of the light from the input. A second reflective surface on the lens block is configured to reflect the second attenuated portion of the light from the first reflective surface, and a second output on the lens block is configured to output the second attenuated portion of the light from the second reflective surface to the reference receiver. For example, the first reflective surface can be disposed at an angled plane relative to the input and the first output. The first section of the first reflective surface can include first divisions of the first reflective surface disposed on the angled plane, and the second section of the first reflective surface can include second divisions of the first reflective surface disposed at an angle from the angled plane.

According to the present disclosure, a method comprises: coupling light from a transmitter into an input of a lens block disposed in an optoelectronic device adjacent the transmitter; reflecting a first attenuated portion of the light from the input incident to a first section of a reflective surface on the lens block, and outputting the first attenuated portion of the light to an optical fiber from an output of the lens block.

The method can further comprise: reflecting a second attenuated portion of the light from the input incident to a second section of the reflective surface; and outputting the second portion of the light from a second output of the lens block to a receiver disposed in the device adjacent the lens block.

The foregoing summary is not intended to summarize each potential embodiment or every aspect of the present disclosure.

DETAILED DESCRIPTION OF THE DISCLOSURE

An optoelectronic device disclosed herein is used with one or more optical fibers for data transmission. The optoelectronic device can be at least part of a board-mounted optical assembly (BOA), an optical engine, an optoelectronic module, a pluggable optoelectronic module, a shortwave multi-mode optical transceiver, an active cable, or the like.

The optoelectronic device includes at least one optical transmitter, at least one optical receiver, and a lens block disposed in the device. The at least one optical transmitter emits light for transmission. An input, such as a collimation lens on the lens block, receives the lights incident thereto. A first section of a first reflective surface on the lens block reflects a first attenuated portion of the light, and a first output, such as a focusing lens, on the lens block outputs the first portion of the light to at least one optical fiber for transmission.

Meanwhile, a second section of the first reflective surface on the lens block reflects a second attenuated portion of the light. A second output, such as a refractive surface, on the lens block outputs the second attenuated portion of the light from the lens block. This second attenuated portion is used for optical monitoring and not for transmission. Accordingly, the at least one optical receiver is disposed in the device adjacent the lens block and receives the second attenuated portion of the light propagated from the second output. The second attenuated portion of the light can then be used to monitor the optical output of the at least one transmitter.

Figure 1A:
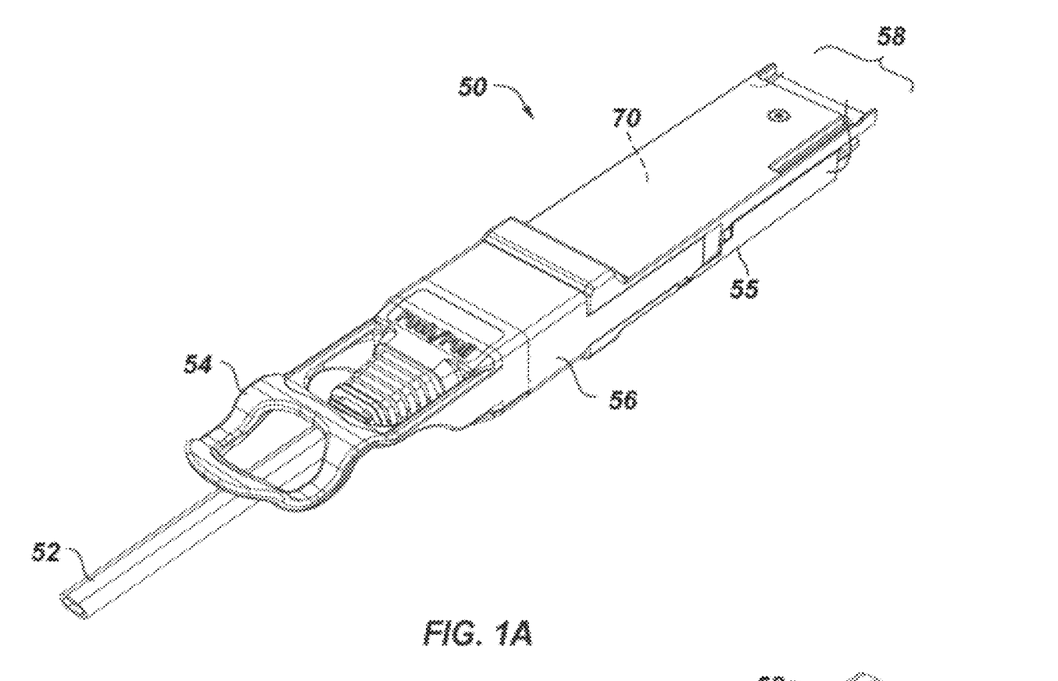
FIG. 1A illustrates a top perspective view of an optoelectronic module and an attached communication cable.
Figure 1B:
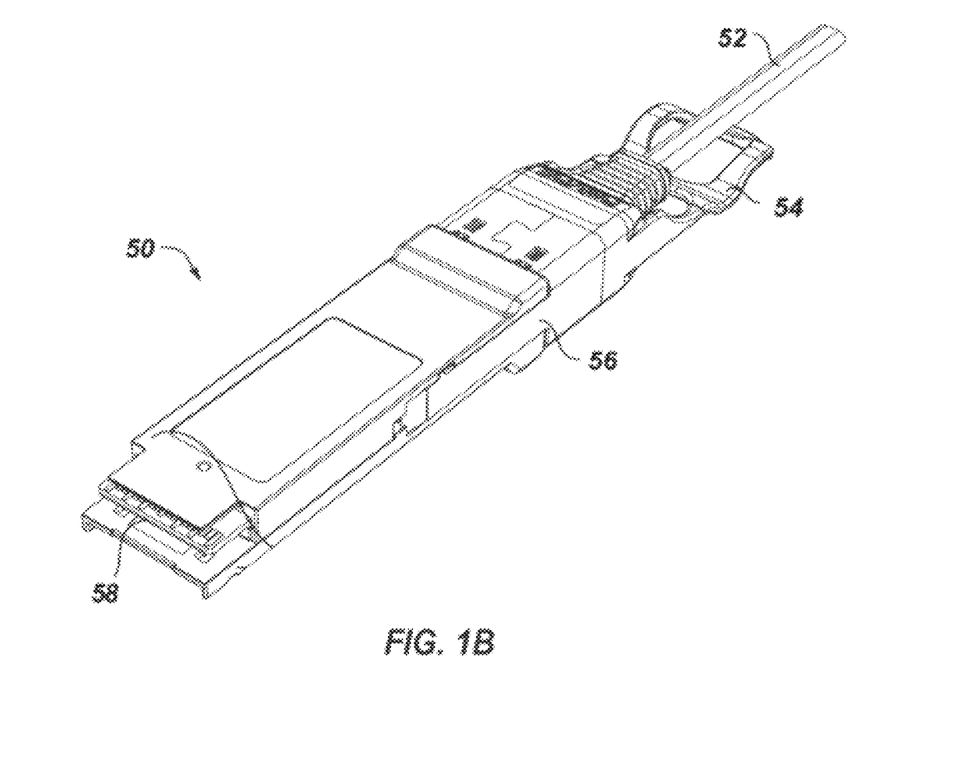
FIG. 1B illustrates a bottom perspective view of the example optoelectronic module and attached communication cable of FIG. 1A.
Figure 2:
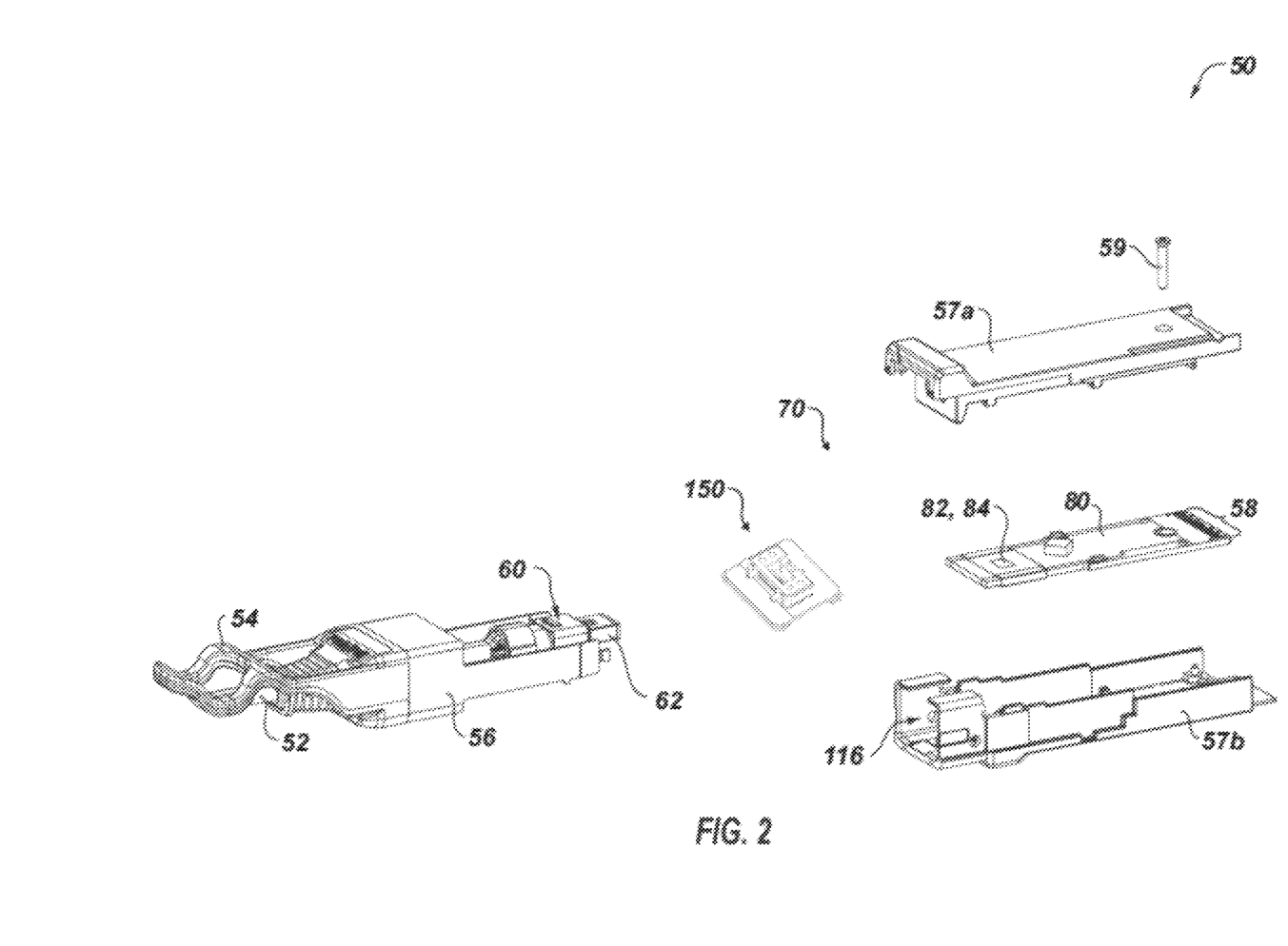
FIG. 2 illustrates an exploded perspective view of the example optoelectronic module and attached communication cable of FIG. 1A showing internal components.

FIGS. 1A and 1B illustrate top and bottom perspective views of one embodiment of an optoelectronic device 50 for transmitting and receiving optical signals in a network and for communicating via electrical signals with a host device (not shown). FIG. 2 illustrates an exploded perspective view of the example optoelectronic module and attached communication cable of FIG. 1A showing internal components.

The optoelectronic device 50 shown here can be fixedly attached to a communication cable 52, and thus the optoelectronic device 50 can represent one end of an "active cable" that includes another optoelectronic module (not shown) attached to the other end of the communication cable 52. As an active optical cable (AOC) assembly, the device 50 generally includes an electronic connector 58, an optical transceiver 70, an optical connector 60, and an optical fiber cable 52. The electronic connector 58 can be plugged into a router or switch. The optical transceiver 70 is embedded inside a housing 55 of the device 50 to perform the electrical-optical conversions. The optical connector 60 can be an MPO type of connector. The connector 60 is permanently attached to the housing 55 and the optical fibers, which results in a protected optical interface. The optical fiber cable 52 connects to the optical connector 60 and extends from the device 50 for connecting with another device 50 to another host device.

Alternatively, the communication cable 52 can instead be detachably connected to the optoelectronic device 50, in which case the optoelectronic device 50 can function as a stand-alone module. For example, where the communication cable 52 is a fiber-optic ribbon cable, the communication cable 52 can be terminated on one or both ends with an MPO-style female connector, and the optoelectronic device 50 may include a corresponding MPO-style male connector configured to pluggably receive the MPO-style female connector.

In either case, the communication cable 52 of the device 50 can be a multichannel fiber-optic communication cable that includes a plurality of optical fibers. The optoelectronic device 50 may be configured for optical signal transmission and reception at a variety of per-second data rates and wavelengths known and used in the art. The device 50 may be configured to support various communication protocols known and used in the art, and the optoelectronic device 50 can be compliant with any suitable form factor.

The optoelectronic device 50 can include a pull tab 54 operably connected to a release slide 56 that can collectively be employed to insert the optoelectronic device 50 into a cage of a host device (not shown) and to extract the optoelectronic device 50 from the cage. The optoelectronic device 50 further includes a housing 55 that generally includes a top shell 57a and a bottom shell 57b and that encloses the internal components of the device 50.

With reference to the expanded view in FIG. 2, the top and bottom shells 57a and 57b of the optoelectronic device 50 are configured to be held together with a fastener 59 and partially surround a modified MPO-style plug 60 with a female MT-style ferrule 62 attached to the communication cable 52. The modified MPO-style plug 60, communication cable 52, pull-tab 54, and the release slide 56 collectively form a cable assembly that may be inserted into the alignment guide receptacle 116. The modified MPO-style plug 60 can connect to the lens block 150 or can connect with other intermediate components (not shown).

The top and bottom shells 57a and 57b also generally surround a printed circuit board (PCB) 80 having an exposed edge connector 58, a lens block 150, a transmitter device or array 82 (e.g., a vertical-cavity surface-emitting laser (VCSEL)), a receiver device or array 84 (e.g., a photodiode), and other components. The transmitter or receiver array 82 or 84 are electrically and physically coupled to the PCB 80. The lens block 150 is mounted to the PCB 80 adjacent the transmitter and receiver devices 82, 84 to route optical signals to and from the optical fibers of the plug 60 and cable 52.

During operation, outgoing electrical data signals travel via the electronic connector 58 from the host device (not shown) into the optoelectronic device 50 including the PCB 80. Transmitter circuitry (not shown) on the PCB 80 refines these electrical data signals before passing them along conductive traces (not shown) to the transmitters of the transmitter array 82. The transmitters of the transmitter array 82 convert these electrical data signals into optical data signals before transmitting them through the lens block 150, the modified MPO-style plug 60, and into the fiber-optic communication cable 52. In this manner, the host device (not shown) into which the optoelectronic device 50 may be positioned can communicate with a remote host device (not shown).

The transmitter array 82 may be an array of optical transmitters such as vertical-cavity surface-emitting lasers (VCSELs), or the like. In some embodiments, both a transmitter array 82 and a receiver array 84 may be included in the optoelectronic device 50, such that the optoelectronic device 50 may become both an optical transmitter and receiver. Alternatively or additionally, the optoelectronic device 50 may include only a single transmitter rather than a transmitter array 82.

In general, the components of the optoelectronic device 50 allow optical signals from laser devices to be coupled into fibers and allow optical signals from fibers to be coupled fibers onto photodiodes. The components may allow for direct coupling or may use a fiber patch cord or a flex circuit. If the direct coupling is used, the lens block 150 and the PCB 80 are extended to the front end of the optoelectronic device 50 where an MPO-style plug 60 may be received.

Figure 3A:
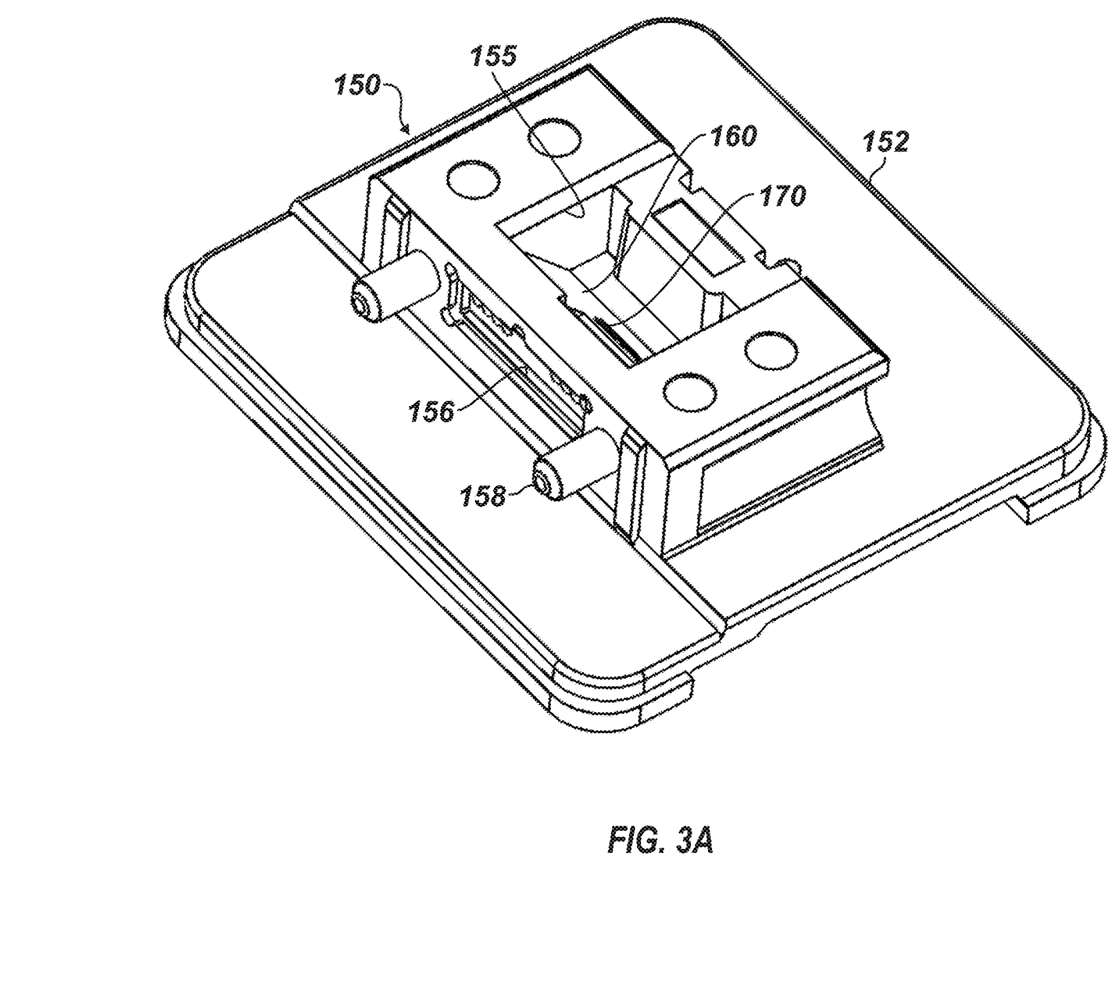
FIG. 3A illustrates a perspective view of a lens block according to the present disclosure.
Figure 3B:
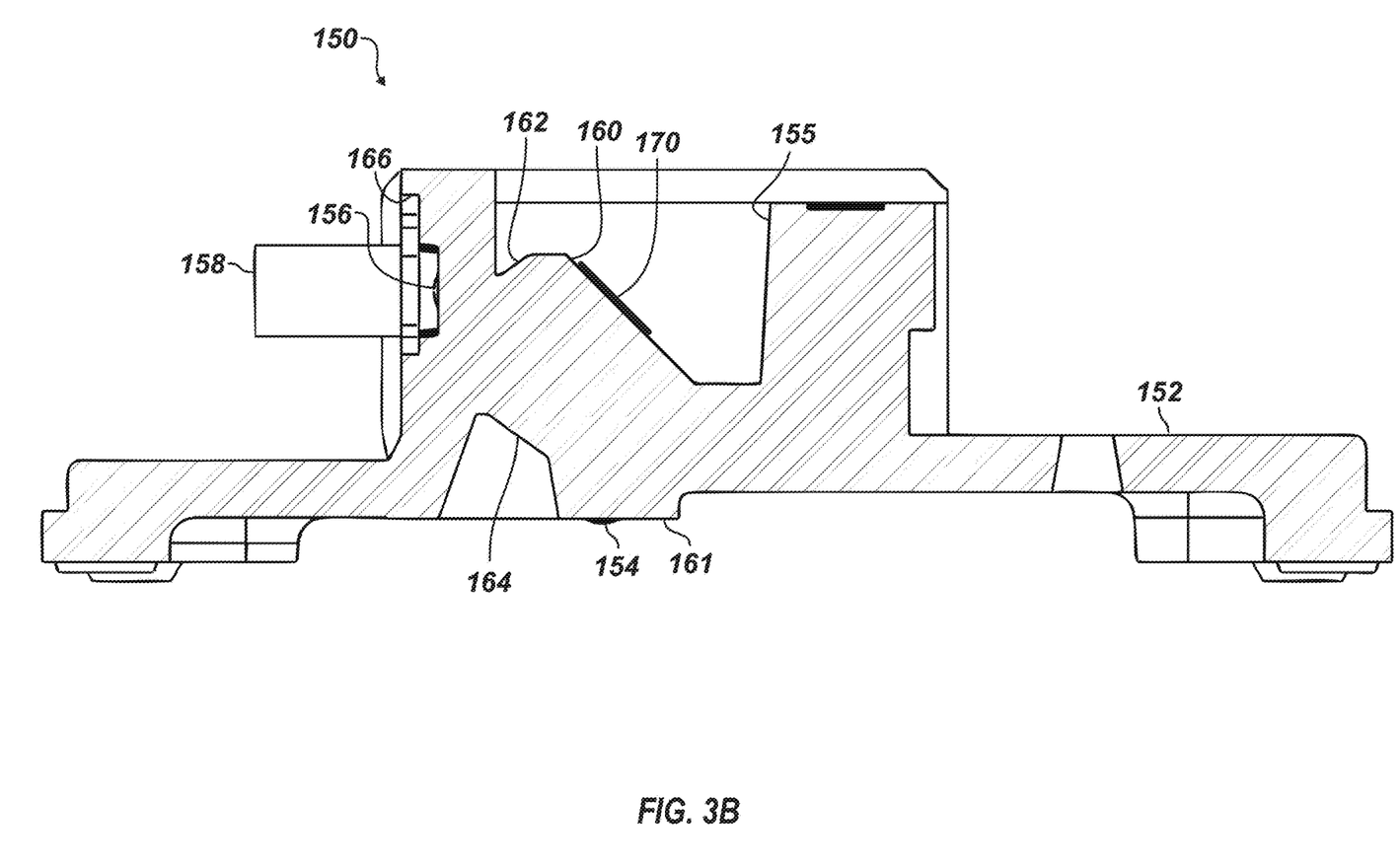
FIG. 3B illustrates a cross-sectional view of the lens block of FIG. 3A.

Having a general understanding of an optoelectronic device 50 and a lens block 150, the discussion turns to the details of the lens block 150 for coupling optical signals between the optical fibers and the active devices on a printed circuit board. In particular, FIG. 3A illustrates a perspective view of a lens block 150, and FIG. 3B illustrates a cross-sectional view of the lens block 150 in FIG. 3A.

The lens block 150 can be composed of an appropriate material that is optically transparent to the optical wavelengths of interest. The lens block 150 includes a platform 152 for attaching to the PCB (80) adjacent the transmitter and receiver components using customary techniques. An output interface 166 and alignment pins 158 are disposed on one side of the lens block 150, and a cavity 155 is defined in the top of the lens block 150 to form first and second reflective surfaces 160, 162. The alignment pins 158 and other features are provided on the output interface 166 to allow a connector for optical fibers to couple and align with the lens block. The alignment pins 158 can be attached to the lens block 150 or may be integral to or formed as part of the lens block 150. Other alignment protrusions and indentations can be provided on the lens block 150 as needed to facilitate alignment of the lens block 150 and any other suitable components. At the bottom as shown in FIG. 3B, the lens block 150 includes an input lens 154 attached to or formed on an input interface 161. A refractive surface 164 is formed in another cavity at the bottom of the lens block 150. Finally, an output lens 156 is attached to or formed on the output interface 166.

The reflective surface 160 of the lens block 150 includes microstructures 170, which can attenuate optical power. In one embodiment, the microstructures 170 on the lens block 150 can be molded by injection molding on the surface 160 so secondary assembly processes are not required and so signal quality can be maintained. Alternatively, features of the microstructures 170 can be separately manufactured and affixed to the reflective surface 160.

Figure 4:
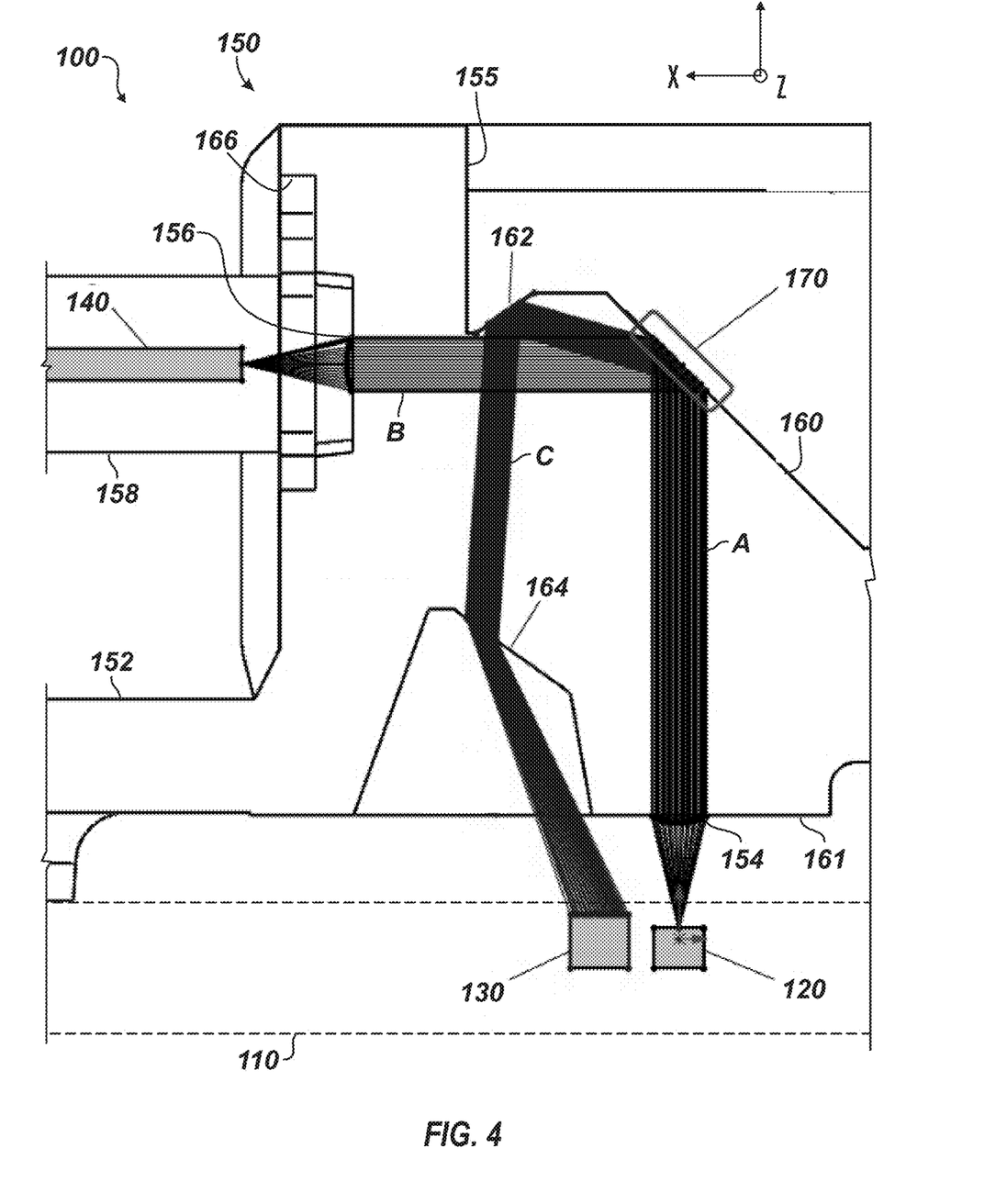
FIG. 4 illustrates a schematic view of an optoelectronic device of the present disclosure having the disclosed lens block routing optical signals relative to optoelectronic components of the device.

Turning to FIG. 4, a portion of an optoelectronic device 100 of the present disclosure is schematically shown. As only partially shown, the device 100 includes a printed circuit board 110 having optoelectronic components (i.e., transmitters 120 and optional monitoring receivers 130) disposed thereon and having a lens block 150 as disclosed herein mounted thereon. As noted, the lens block 150 is used for routing optical signals relative to the optoelectronic components 120, 130 on the PCB 110. Features of the lens block 150 are similar to those discussed above so like reference numerals are used.

For example, the base 152 of the lens block 150 can stand the block 150 off from the PCB 110 so the lens block 150 can be mounted or otherwise mechanically secured to the PCB 110 and so the optical components 120, 130 can be positioned on the PCB 110 under the base 152. The lens block 150 includes the alignment pins 158 to facilitate the alignment of the lens block 150 to a female MT-style ferrule (not shown), which couples optical fibers 140 to the lens block 150.

As described above, optical signals may be generated from electrical signals received from a host device (not shown) along traces on the PCB 110. The PCB 110 may include one or more transmitters 120, such as a transmitter array configured as a VCSEL array, for converting electrical signals into optical signals. The optical signals generated by the transmitters 120 are optically coupled to the lens block 150. In turn, the lens block 150 optically couples the optical signals to an optical element, such as optical fibers 140. For example, the optical fibers 140 can be part of a female MT-style ferrule (not shown) in an MPO-style plug (not shown).

The lens block 150 includes one or more focusing output lenses 156 positioned across from each end of the optical fibers 140. In FIG. 4, only one of the focusing output lenses 156 is visible. The lens block 150 can include more than one focusing output lens 156 arranged side-by-side in a lateral Z-direction on the lens block 150. The focusing output lens 156 can be integrally formed to the lens block 150 or can be attached to a surface of the lens block 150.

The lens block 150 includes the angled surface or plane 160 offset from the focusing output lenses 156 in the X direction and offset from the input lenses 154 in the Y-direction. The lens block 150 can be a solid structure between the lenses 154, 156, and the angled surface 160. The angled surface 160 may be reflective or at least partially reflective. Thus, the angled surface 160 redirects optical signals that impinge the angled surface 160. For example, optical signals from the transmitters 120 travel in the Y direction, impinge on the angled surface 160 and are redirected in the X direction to the optical fibers 140.

As noted, the optoelectronic device 100 can be a short-wave multi-mode optical transceiver, an active optical cable (AOC), or the like. The lens block 150 attenuates the optical power of a main optical beam A from the transmitter 120 of the device 100 and provides a split beam C for optical power monitoring of the transmitter 120. Moreover, the lens block 150 can be configured to control higher-order modes (HOM) of multi-mode short wave signals based on a selected configuration of the microstructures 170 on the lens block 150. Used in a multi-mode transceiver or active optical cable (AOC) assembly, the transmitter 120 for the optoelectronic device 100 can include VCSELs (Vertical Cavity Surface Emitting Lasers).

As noted in the background of the present disclosure, a carbon-doped lens, an attenuation plate, or an antireflection (AR) coating can be used to provide optical attenuation. Implementing these techniques can be costly and can require secondary assembly steps to be performed, which can introduce contaminants during the assembly process. The microstructures 170 on the lens block 150 of the present disclosure avoid these issues.

During operation as shown in FIG. 4, the light from the transmitter 120, such as the VCSEL or the like, on the PCB 110 is emitted vertically upward incident to the input lens 154. As noted, the transmitter 120 may be part of a transmitter array having multiple transmitters disposed along a Z-axis on the PCB 110. The input lens 154 can be a collimation lens to collimate the light from the transmitter 120.

The collimated light A passes through the lens block 150. Reaching the optical plane of the reflective surface 160, the microstructures 170 divide the collimated light A into two attenuated portions B, C. Some of the microstructures 170 on the optical plane of the surface 160 totally reflect a first attenuated portion B of the light towards the output lens 156 on the lens block 150. The output lens 156 can be a focusing lens that focuses the light into a corresponding optical fiber 140 as an attenuated signal for transmission.

Some of the microstructures 170 on the optical plane of the first reflective surface 160 also totally reflect a second attenuated portion C of the transmitted light away from the output lens 156 so that attenuated portion C is not focused into the fiber 140. According to one embodiment of the present disclosure, monitoring the power of the transmitter 120 is optional so the optoelectronic device 100 may not include a monitoring receiver 130 associated with the transmitter 120. If there is no monitoring receiver 130, the structure 170 can be used primarily for attenuation of the light delivered to the fiber 140, and the second attenuated portion C may not be used functionally.

According to another embodiment of the present disclosure, however, monitoring the power of the transmitter(s) 120 is performed so that the optoelectronic device 100 includes a monitoring receiver 130 associated with the transmitter 120. In this monitoring configuration, some of the microstructures 170 on the optical plane of the first reflective surface 160 totally reflect the second attenuated portion C of the transmitted light toward a second optical plane on the second reflective surface 162 on the lens block 150. Reflected by this second reflective surface 162, this split portion C propagates down through the lens block 150 and reaches another optical plane of the refractive surface 164. Refracted at the optical plane, the split portion C impinges into the monitoring receiver 130, which can be an optical power monitor such as a photodiode, so the power of the transmitter 120 can be monitored in real-time.

Using the optical power monitor 130, the optoelectronic device 100 can provide Digital Diagnostics Monitoring (DDM) functions. The power monitor 130 can be used independently from any other signal receivers (e.g., 84; FIG. 1) if provided on the PCB 110 to receive optical signals from any of the other optical fibers 140.

By further configuring the shape, density, and distribution of the microstructures 170, the lens block 150 can attenuate the optical power of the first and second attenuated portions B, C in specific areas. This allows the lens block 150 to be used for controlling higher-order modes (HOM) for multi-mode short-wave signals.

Figure 5A:
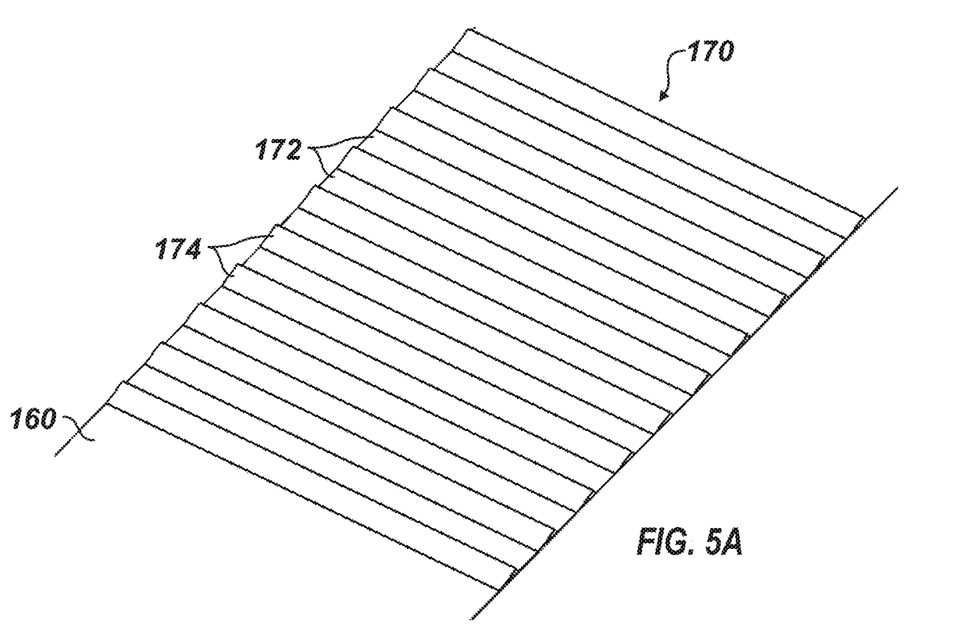
FIG. 5A illustrates a perspective view of one arrangement for the microstructures.
Figure 5B:
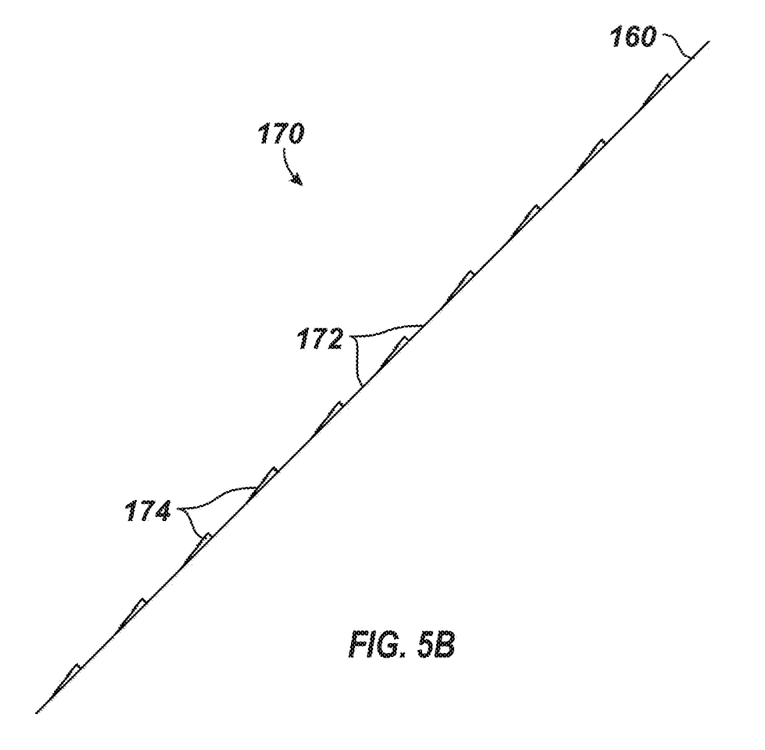
FIG. 5B illustrates a side view of the arrangement of the microstructures in FIG. 5A.

FIG. 5A illustrates a perspective view of one configuration for microstructures 170 on the plane of the lens block's reflective surface 160, and FIG. 5B illustrates a side view of the microstructures 170. (Only a portion of the surface 160 is shown.) The microstructures 170 include first sections 172 arranged at an angular orientation to totally reflect incident light to the focusing output lens (156) of the lens block (150). These first sections 172 can include lateral divisions of the lens block's surface 160. The microstructures 170 further include second sections 174 arranged at a different angular orientation to totally reflect incident light to the opposing plane of the second surface (162) of the lens block 150. These second sections 174 can be lateral divisions alternatingly arranged between the first sections 172 and tilted at an angle therefrom.

Other arrangements of the sections 172, 174 can be used, such as a checkered pattern or a longitudinal pattern. For example, FIGS. 6A-6C illustrate plan views of other arrangements for the microstructures 170 of the present disclosure.

Figure 6A:
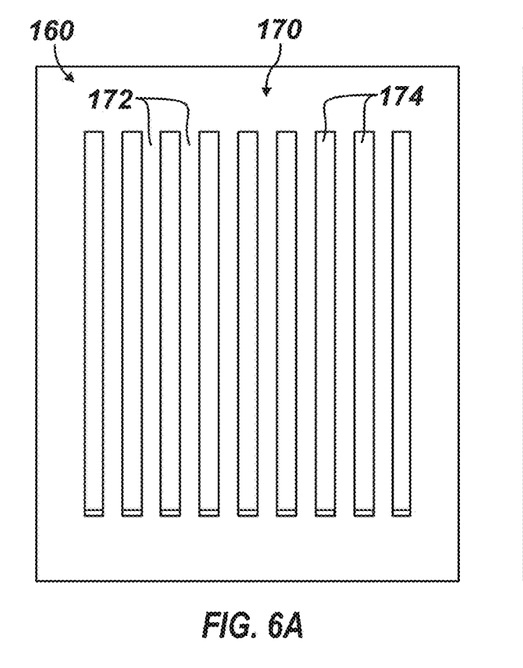
FIGS. 6A-6C illustrate plan views of other arrangements for the microstructures of the present disclosure.

In FIG. 6A, first sections 172 are longitudinal divisions of the lens block's surface 160 to totally reflect incident light to the focusing output lens (156) of the lens block (150). The second sections 174 are other longitudinal divisions alternatingly arranged between the first sections 172 and tilted at an angle therefrom to totally reflect incident light to the opposing plane of the second reflective surface (162) of the lens block 150.

Figure 6B:
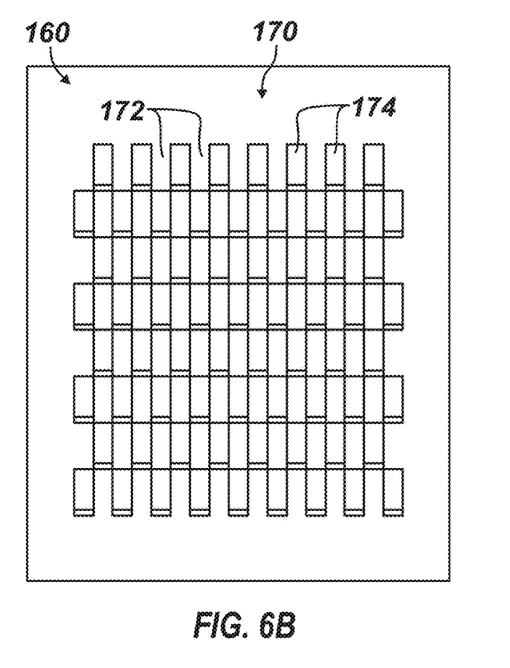

In FIG. 6B, first sections 172 are checkered divisions of the lens block's surface 160 to totally reflect incident light to the focusing output lens (156) of the lens block (150). The second sections 174 are other checkered divisions alternatingly arranged between the first sections 172 and tilted at an angle therefrom to totally reflect incident light to the opposing plane of the second reflective surface (162) of the lens block 150

Figure 6C:
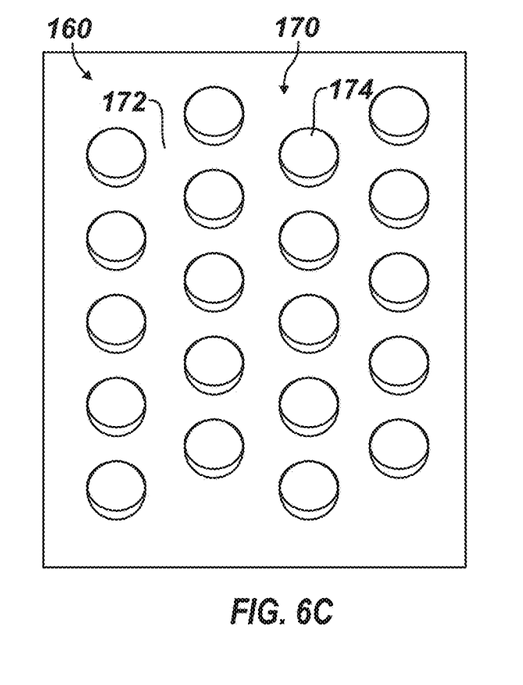

In FIG. 6C, first sections 172 are interstitial portions of the lens block's surface 160 to totally reflect incident light to the focusing output lens (156) of the lens block (150). The second sections 174 are other tabs alternatingly arranged on the lens block's surface 160 and tilted at an angle therefrom to totally reflect incident light to the opposing plane of the second reflective surface (162) of the lens block 150

In general, the sections 172, 174 can be discrete elements formed on the first reflective surface 160 and can be uniformly or randomly arranged. The number or proportion of the sections 172, 174 can be configured for desired attenuation and routing. Again, the shape, density, and distribution of the microstructures 170 can be configured on the lens block 150 to attenuate optical power in specific areas, such as controlling higher-order modes (HOM) for multimode short-wave signals.

Preferably, the sections 172, 174 of the microstructures 170 are integrally formed on the lens block 150 during manufacture, such as injection molding. Alternatively, the microstructures 170 can be integrally formed on an independent element by injection molding, and the independent element of the microstructures 170 can be affixed to a surface of the lens block 150. Of course, consideration of transitions between refractive indices should be considered.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. An optoelectronic device used with at least one optical fiber, the optoelectronic device comprising:
    at least one transmitter disposed in the optoelectronic device and being configured to emit light;
    a lens block disposed in the optoelectronic device adjacent the at least one transmitter;
    an input on the lens block being configured to receive the light emitted from the at least one transmitter incident thereto;
    a first section of a first reflective surface on the lens block being configured to reflect a first attenuated portion of the light;
    a first output on the lens block being configured to output the first attenuated portion of the light to the at least one optical fiber;
    a second section of the first reflective surface being configured to reflect a second attenuated portion of the light;
    a second output on the lens block being configured to output the second attenuated portion of the light; and
    at least one receiver disposed in the optoelectronic device adjacent the lens block and being configured to receive the second attenuated portion of the light propagated from the second output,
    wherein the second output of the lens block comprises:
        a second reflective surface opposing the first reflective surface, the second reflective surface being configured to reflect the second attenuated portion of the light; and
        a refractive surface adjacent to a cavity being configured to refract the second attenuated portion of the light into the cavity to outside the lens block to the at least one receiver;
    wherein:
        the first reflective surface is disposed at an angled plane relative to the input and the first output;
        the first section of the first reflective surface comprises first divisions of the first reflective surface disposed on the angled plane;
        the second section of the first reflective surface comprises second divisions of the first reflective surface disposed at an angle from the angled plane; and
        the first divisions and the second divisions are arranged in a checkered pattern across a portion of the first reflective surface.

2. The optoelectronic device of claim 1, wherein the input comprises at least one collimation lens on the lens block being configured to collimate the light emitted from the at least one transmitter incident thereto; and wherein the first output comprises at least one focusing lens on the lens block being configured to focus the first attenuated portion of the light to the at least one optical fiber.

3. The optoelectronic device of claim 2, wherein the at least one collimation lens is formed on a first surface of the lens block or is attached on the first surface; and wherein the at least one focusing lens is formed on a second surface of the lens block or is attached on the second surface.

4. The optoelectronic device of claim 1, wherein the first reflective surface is disposed at an angled plane relative to the input and the first output; and wherein the first section of the first reflective surface comprises first divisions of the first reflective surface disposed on the angled plane.

5. The optoelectronic device of claim 1, further comprises a printed circuit board disposed in the optoelectronic device and having the at least one transmitter, the at least one receiver, and the lens block mounted thereon.

6. The optoelectronic device of claim 5, wherein the at least one receiver is mounted on the printed circuit board adjacent the at least one transmitter; and wherein the lens block is mounted on the printed circuit board over the at least one transmitter and the at least one receiver.

7. The optoelectronic device of claim 1, wherein the second divisions are disposed at the angle being configured to reflect the second attenuated portion of the light to the second reflective surface, the second reflective surface being configured to reflect the second attenuated portion of the light.

8. The optoelectronic device of claim 1, wherein the at least one transmitter comprises a VCSEL; and wherein the at least one receiver comprises a photodiode configured to monitor output of the VCSEL.

9. An active optical cable having the optoelectronic device of claim 1.

10. A lens block for routing light from a transmitter to an optical fiber, the lens block comprising:
    an input on the lens block being configured to receive the light emitted from the transmitter incident thereto;
    a first section of a first reflective surface on the lens block being configured to reflect a first attenuated portion of the light from the input;
    a first output on the lens block being configured to output the first attenuated portion of the light from the first reflective surface to the optical fiber;
    a second section of the first reflective surface being configured to reflect a second attenuated portion of the light from the input; and
    a second reflective surface on the lens block being configured to reflect the second attenuated portion of the light from the first reflective surface; and
    a second output on the lens block being configured to output the second attenuated portion of the light from the second reflective surface to a reference receiver,
    wherein:
        a refractive surface adjacent to a cavity is configured to refract the second attenuated portion of the light into the cavity to outside the lens block to the reference receiver;
        the first reflective surface is disposed at an angled plane relative to the input and the first output;
        the first section of the first reflective surface comprises first divisions of the first reflective surface disposed on the angled plane;
        the second section of the first reflective surface comprises second divisions of the first reflective surface disposed at an angle from the angled plane; and the first divisions and the second divisions are arranged in a checkered pattern across a portion of the first reflective surface.

11. The lens block of claim 10, wherein the input comprises a collimation lens on the lens block being configured to collimate the light emitted from the transmitter incident thereto; and wherein the first output comprises a focusing lens on the lens block being configured to focus the first attenuated portion of the light to the optical fiber.

12. An optoelectronic device used with at least one optical fiber, the optoelectronic device comprising:
   at least one transmitter disposed in the optoelectronic device and being configured to emit light;
   a lens block disposed in the optoelectronic device adjacent the at least one transmitter;
   an input on the lens block being configured to receive the light emitted from the at least one transmitter incident thereto;
   a first section of a first reflective surface on the lens block being configured to reflect a first attenuated portion of the light;
   a first output on the lens block being configured to output the first attenuated portion of the light to the at least one optical fiber;
   a second section of the first reflective surface being configured to reflect a second attenuated portion of the light:
   a second output on the lens block being configured to output the second attenuated portion of the light; and
   at least one receiver disposed in the optoelectronic device adjacent the lens block and being configured to receive the second attenuated portion of the light propagated from the second output,
   wherein the second output of the lens block comprises:
      a second reflective surface opposing the first reflective surface, the second reflective surface being configured to reflect the second attenuated portion of the light; and
      a refractive surface adjacent to a cavity being configured to refract the second attenuated portion of the light into the cavity to outside the lens block to the at least one receiver;
   wherein:
      the first reflective surface is disposed at an angled plane relative to the input and the first output;
      the first section of the first reflective surface comprises first divisions of the first reflective surface disposed on the angled plane;
      the second section of the first reflective surface comprises second divisions of the first reflective surface disposed at an angle from the angled plane; and
      the first divisions and the second divisions are interstitial portions of the first reflective surface.

13. A lens block for routing light from a transmitter to an optical fiber, the lens block comprising:
   an input on the lens block being configured to receive the light emitted from the transmitter incident thereto;
   a first section of a first reflective surface on the lens block being configured to reflect a first attenuated portion of the light from the input;
   a first output on the lens block being configured to output the first attenuated portion of the light from the first reflective surface to the optical fiber;
   a second section of the first reflective surface being configured to reflect a second attenuated portion of the light from the input; and
   a second reflective surface on the lens block being configured to reflect the second attenuated portion of the light from the first reflective surface; and
   a second output on the lens block being configured to output the second attenuated portion of the light from the second reflective surface to a reference receiver;
   wherein:
      a refractive surface adjacent to a cavity is configured to refract the second attenuated portion of the light into the cavity to outside the lens block to the reference receiver;
      the first reflective surface is disposed at an angled plane relative to the input and the first output;
      the first section of the first reflective surface comprises first divisions of the first reflective surface disposed on the angled plane;
      the second section of the first reflective surface comprises second divisions of the first reflective surface disposed at an angle from the angled plane; and
      the first divisions and the second divisions are interstitial portions of the first reflective surface.

* * * * *